United States Patent
Uto et al.

(10) Patent No.: US 11,474,353 B2
(45) Date of Patent: Oct. 18, 2022

(54) HEAD-UP DISPLAY APPARATUS FOR DISPLAYING VIRTUAL IMAGE

(71) Applicant: Nippon Seiki Co., Ltd., Niigata (JP)

(72) Inventors: Yuya Uto, Niigata (JP); Takaharu Iwaya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 324 days.

(21) Appl. No.: 16/643,360

(22) PCT Filed: Jul. 30, 2018

(86) PCT No.: PCT/JP2018/028474
§ 371 (c)(1),
(2) Date: Feb. 28, 2020

(87) PCT Pub. No.: WO2019/044322
PCT Pub. Date: Mar. 7, 2019

(65) Prior Publication Data
US 2020/0363637 A1    Nov. 19, 2020

(30) Foreign Application Priority Data
Aug. 28, 2017 (JP) .............................. JP2017-163422

(51) Int. Cl.
*G03H 1/00* (2006.01)
*G02B 27/01* (2006.01)
(Continued)

(52) U.S. Cl.
CPC .......... *G02B 27/0103* (2013.01); *B60K 35/00* (2013.01); *B60R 11/0229* (2013.01); *G02B 2027/0105* (2013.01)

(58) Field of Classification Search
CPC ........ G02B 27/0103; G02B 2027/0105; B60K 35/00; B60R 11/0229
(Continued)

(56) References Cited

U.S. PATENT DOCUMENTS 5,566,048 A * 10/1996 Esterberg .............. G06F 1/1681
16/342
2014/0368544 A1    12/2014 Kobayashi
(Continued)

FOREIGN PATENT DOCUMENTS

| JP | 2012-56334 A | 3/2012 |
| JP | 2014-21391 A | 2/2014 |

(Continued)

OTHER PUBLICATIONS

International Search Report issued in corresponding International Patent Application No. PCT/JP2018/028474, dated Oct. 16, 2018, with English translation.

*Primary Examiner* — Jonathan M Blancha
(74) *Attorney, Agent, or Firm* — McDermott Will & Emery LLP (57) ABSTRACT

A head-up display apparatus in which display light emitted by a display device to express an image is reflected by a reflecting part, and a virtual image corresponding to the reflected image is displayed. The apparatus includes: a reflecting-part holder provided with a pair of rotary shaft parts protruding at both ends thereof, the rotary shaft parts retaining the reflecting part; a pair of bearings rotatably supporting the pair of rotary shaft parts; and a pair of bearing holders retaining the pair of bearings in a housing; first supported parts protruding in the radial direction of the bearings provided to the bearing holders, and the housing provided with a hole-shaped first support part in which the first supported part of one bearing holder is positioned, and an elongated-hole-shaped second support part elongated in
(Continued)

an axial direction in which the first supported part of the other bearing holder is positioned.

6 Claims, 5 Drawing Sheets

(51) Int. Cl.
    *B60K 35/00*     (2006.01)
    *B60R 11/02*     (2006.01)

(58) Field of Classification Search
    USPC .......................................................... 359/13
    See application file for complete search history.

(56) References Cited

U.S. PATENT DOCUMENTS

| | | | |
|---|---|---|---|
| 2015/0286054 A1 | 10/2015 | Ushida et al. | |
| 2017/0146282 A1* | 5/2017 | Dodge | F25D 23/028 |
| 2017/0371158 A1* | 12/2017 | Tang-Kong | G02B 27/0149 |
| 2019/0219823 A1* | 7/2019 | Henon | G02B 27/0101 |
| 2021/0132332 A1* | 5/2021 | Fujimoto | B60K 35/00 |

FOREIGN PATENT DOCUMENTS

| | | |
|---|---|---|
| JP | 2014-85539 A | 5/2014 |
| JP | 2017-68190 A | 4/2017 |

\* cited by examiner

HEAD-UP DISPLAY APPARATUS FOR DISPLAYING VIRTUAL IMAGE

CROSS REFERENCE

This application is the U.S. National Phase under 35 U.S.C. § 371 of International Application No. PCT/JP2018/028474, filed on Jul. 30, 2018, which claims the benefit of Japanese Patent Application No. 2017-163422, filed on Aug. 28, 2017, the entire contents of each are hereby incorporated by reference.

TECHNICAL FIELD

The present invention relates to a head-up display apparatus.

BACKGROUND ART

There is known a head-up display (HUD) apparatus including a display device for emitting display light expressing a predetermined image, the head-up display (HUD) apparatus for projecting the display light from the display device onto a vehicle windshield or the like via a reflecting member such as a concave mirror to allow a user to visually recognize a display image as a virtual image along with outside scene.

Patent Document 1 discloses a head-up display apparatus including supported parts serving as rotary shafts protruding from both ends of a reflecting member to adjust an angle of the reflecting member, and support parts that rotatably support the supported parts, and having a structure in which the reflecting member is rotatably retained. The head-up display apparatus according to Patent Document 1 has a structure in which a spherical surface is formed at the supported part at one end, a sliding surface in point contact or line contact with the spherical surface is formed on the support parts, and an elastic member is provided to press the supported part and the corresponding support part against each other so that there is no gap therebetween to support the supported part. In the structure, the supported part at the other end also has a curved surface part and is supported at a sliding surface in point contact or line contact with the curved surface part, and an elastic member is provided so that there is no gap therebetween.

PRIOR ART DOCUMENT

Patent Document

Patent Document 1: Japanese Unexamined Patent Application Publication No. 2014-85539

SUMMARY OF THE INVENTION

Problems to be Solved by the Invention

The head-up display apparatus according to Patent Document 1 has the structure in which, to rotatably support the reflecting member, the spherical surface is provided between the supported part and the support part to make point contact or line contact therebetween, and the elastic member urges the parts. As a result, such a support structure is complicated so that there is room for improvement to increase the size of the reflecting member. In particular, since the supported parts serving as rotary shafts are provided at both ends of the reflecting member, if the reflecting member is increased in size, then the distance between the rotary shafts is longer, and this causes a problem in that the fabrication precision of the reflecting member and axis deviation error between the rotary shafts located at both the ends have a significant influence.

The present invention has been made in view of the above circumstances, and an object of the present invention is to provide a head-up display apparatus in which an assembly operation can be performed with good precision while avoiding the effects of axis deviation error, the fabrication precision of a reflecting member, and the like.

Solution to Problem

To achieve the above object, the head-up display apparatus of the present invention is a head-up display apparatus for reflecting, by a reflecting part, display light emitted by a display device to express an image and displaying a virtual image corresponding to the image by the display light reflected by the reflecting part. The head-up display apparatus includes a reflecting-part holder provided with a pair of rotary shaft parts protruding at both ends of the reflecting-part holder, the reflecting-part holder for retaining the reflecting part, a pair of bearings for rotatably supporting the pair of rotary shaft parts respectively, and a pair of bearing holders for retaining the pair of bearings in a housing respectively. A first supported part protruding in a radial direction of each of the bearings is provided to each of the bearing holders. The housing includes a hole-shaped first support part in which the first supported part of one of the bearing holders is positioned, and an elongated-hole-shaped second support part elongated in an axial direction of the rotary shaft parts in which the first supported part of the other of the bearing holders is positioned.

Effect of the Invention

According to the present invention, it is possible to perform an assembly operation with good precision while the effects of axis deviation error, the fabrication precision of a reflecting member, and the like are avoided.

MODE FOR CARRYING OUT THE INVENTION

A head-up display apparatus according to one embodiment of the present invention will be described with reference to the drawings.

Figure 1:
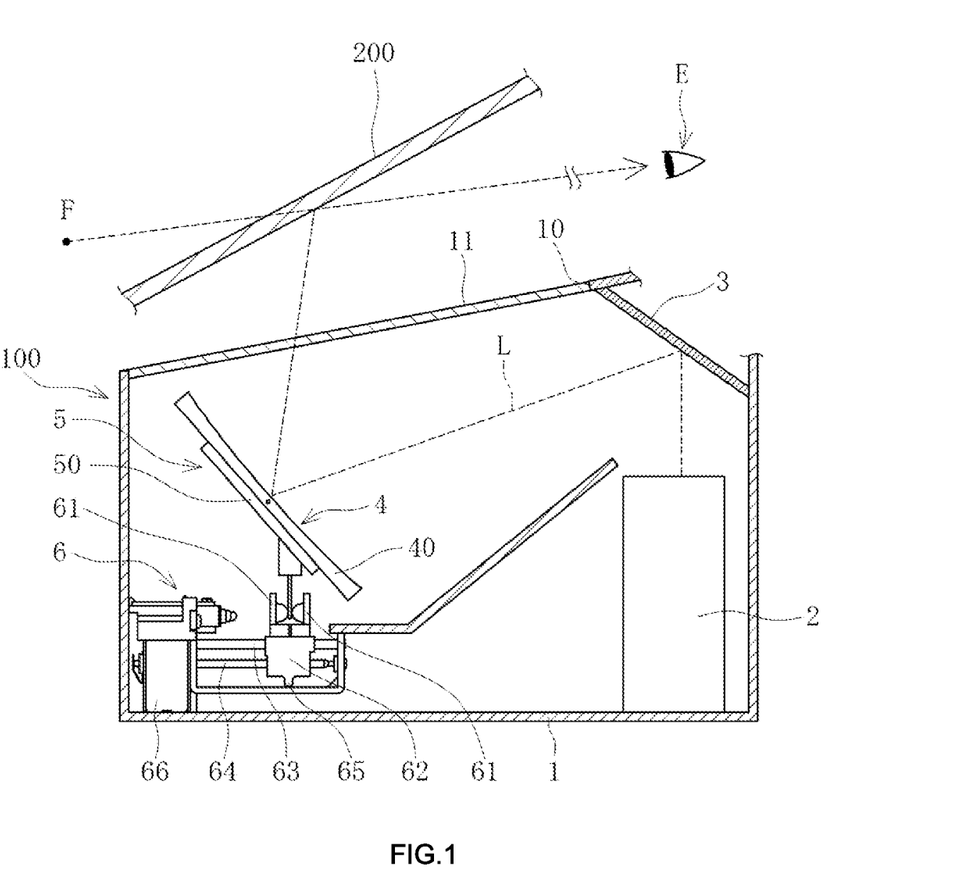
FIG. 1 is a schematic cross-sectional view for explaining a configuration of a head-up display apparatus according to one embodiment of the present invention.

A head-up display apparatus (hereinafter abbreviated as an HUD apparatus) 100 is mounted on, for example, an automobile, and includes a housing 1, a display device 2, a plane mirror 3, a reflecting part 4 having a reflecting member 40, a reflecting-part support mechanism 5, and a reflecting-part drive mechanism 6, as illustrated in FIG. 1, and also a circuit board not illustrated.

The HUD apparatus 100 reflects, by the plane mirror 3 and the reflecting part 4, display light L emitted from the display device 2 to express a predetermined image, and emits the display light L to a windshield 200 of the vehicle on which the HUD apparatus 100 is mounted, to display a virtual image corresponding to the image. The contents to be displayed as such a virtual image by the HUD apparatus 100 are various vehicle information, navigation information, and the like.

The housing 1 is made of a metal material, for example, the same titanium alloy as that of a reflecting-part holder 50 described later, and houses therein the display device 2, the plane mirror 3, the reflecting part 4, the reflecting-part support mechanism 5, and the reflecting-part drive mechanism 6, and the circuit board (not illustrated). An opening part 10 that allows the display light L to pass through the housing 1 to the windshield 200 is formed at a portion of the housing 1 facing the windshield 200. The opening part 10 is covered with a translucent cover 11. It is noted that details of the housing 1 will be described later.

The display device 2 emits the display light L expressing an image (notification image) for notifying information such as various vehicle information and navigation information, and includes, for example, a transmissive liquid crystal display including a liquid crystal panel and a light source for backlight, or a self-luminous display.

The plane mirror 3 reflects the display light L emitted by the display device 2 toward the reflecting part 4.

The reflecting part 4 has the reflecting member 40 that further reflects the display light L reflected by the plane mirror 3 and emits the display light L toward the windshield 200. The reflecting member 40 is composed of a concave mirror in which a reflecting film is formed on the surface of a base material made of, for example, a synthetic resin material, by way of vapor deposition or the like.

As will be described later, the reflecting member 40 is attached to the reflecting-part holder 50, and supported by the reflecting-part support mechanism 5 to be rotatable about a horizontal rotary shaft. The rotation angle of the reflecting member 40 is adjusted by the reflecting-part drive mechanism 6 to change the emission angle of the display light L toward the windshield 200.

The display light L reflected by the reflecting member 40 passes through the translucent cover 11 provided in the opening part 10 of the housing 1 and travels toward the windshield 200. The display light L that has reached the windshield 200 and then reflected by the windshield 200 forms a virtual image (a display image visually recognized by an observer E) of a notification image at a front position F (see FIG. 1) of the windshield 200 while light from the front is transmitted. As a result, the HUD apparatus 100 can cause the observer E (mainly the driver of the vehicle) to visually recognize both the virtual image and outside scene and the like that actually exist in front.

The reflecting-part support mechanism 5 supports the reflecting member 40 of the reflecting part 4 to the housing 1 to be rotatable about the axis of the rotary shaft part 51.

In the HUD apparatus 100 of the present invention, the reflecting-part support mechanism 5 includes a reflecting-part holder 50 provided with a pair of the rotary shaft parts 51 protruding at both ends, the reflecting-part holder 50 for retaining the reflecting member 40 of the reflecting part 4, a pair of bearings 52 for rotatably supporting the pair of rotary shaft parts 51 respectively, and a pair of bearing holders 53 for retaining the pair of bearings 52 in the housing 1 respectively.

That is, in the HUD apparatus 100 of the present invention, the reflecting member 40 formed of the concave mirror in the reflecting part 4 is attached to the reflecting-part holder 50 separated from the reflecting member 40, and the pair of rotary shaft parts 51 at both ends of the reflecting-part holder 50 are supported on the housing 1 via the bearings 52 and the bearing holders 53 respectively so that the reflecting member 40 is rotatable.

Figure 3:
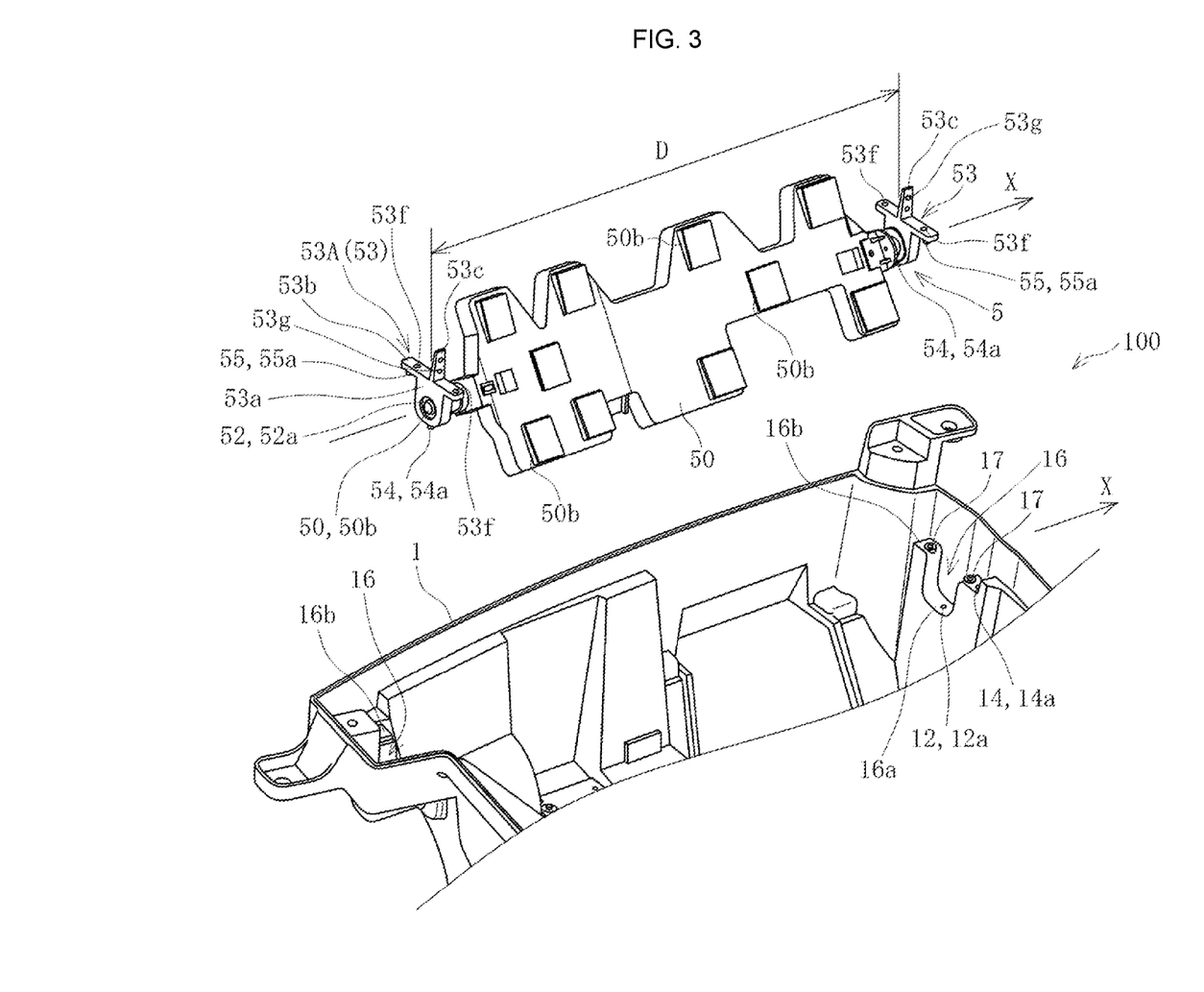
FIG. 3 is a partial perspective view illustrating a state in which a reflecting-part holder and a casing are exploded.
Figure 5A:
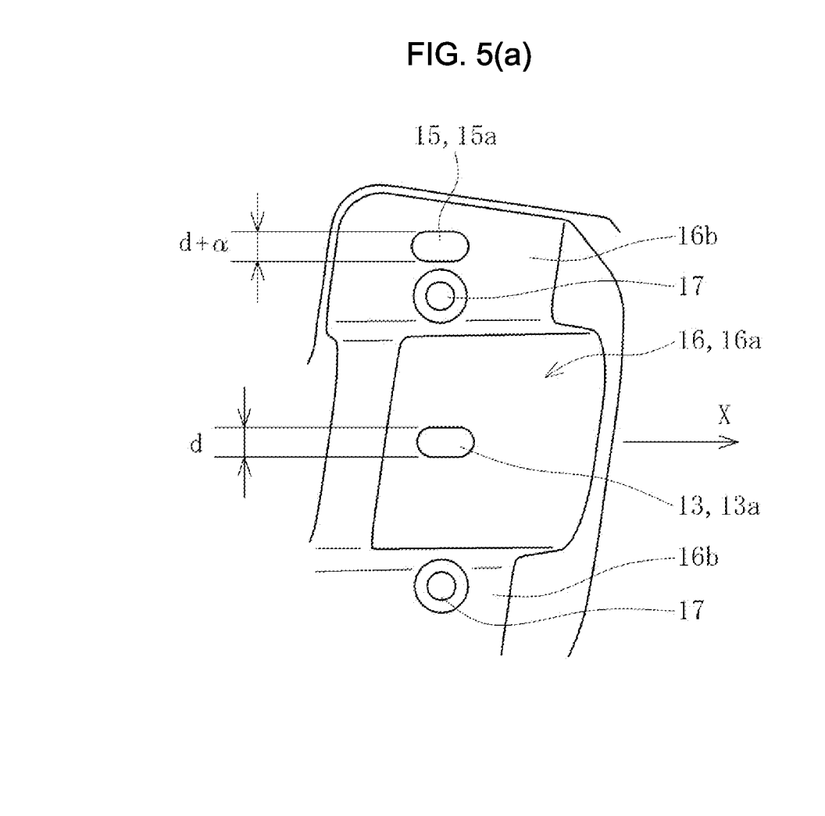
FIG. 5(a) is a partial plan view of one side of a housing.
Figure 5B:
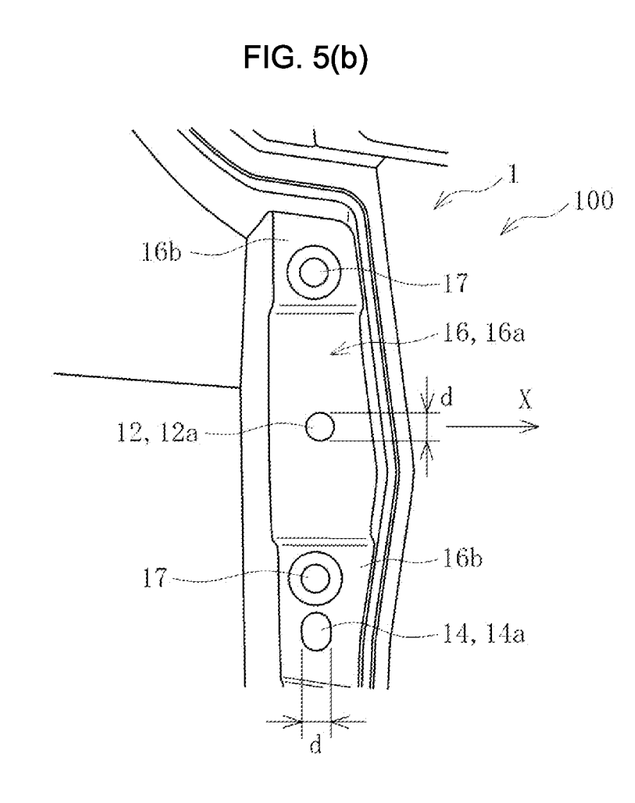
FIG. 5(b) is a partial plan view of the other side of the housing.

Further, in the HUD apparatus 100 of the present invention, each of the bearing holders 53 is provided with a first supported part 54 protruding in the radial direction of each of the bearings 52, and the housing 1 includes a hole-shaped first support part 12 in which the first supported part 54 of one bearing holder 53 of the bearing holders is positioned, and an elongated-hole-shaped second support part 13 along an axial direction X of the rotary shaft parts 51 in which the first supported part 54 of the other bearing holder 53A of the bearing holders is positioned (see FIGS. 3 and 5).

As a result, the reflecting part 4 is positioned in a way that the first supported part 54 serving as a columnar positioning pin 54a of the bearing holder 53 provided in the radial direction of the bearing 52 is fitted into the true-circle hole-shaped first support part 12 of the housing 1, and the first supported part 54 provided in the bearing holder 53A on the opposite side is inserted into the elongated-hole-shaped second support part 13 along the axial direction X of the rotary shaft parts 51.

That is, the one bearing holder (on the right side in the illustrated example) 53 is positioned at a predetermined position of the housing 1 by the first supported part 54 and the first support part 12. Further, the other bearing holder (on the left side being the opposite side in the illustrated example) 53A is allowed to have, for example, a dimensional tolerance in the axial direction X because of the elongated-hole-shaped second support part 13, and will be positioned in the orthogonal direction intersecting the axial direction X by positioning a positioning pin being the first supported part 54 into the second support part 13 having the same width as the diameter of the pin.

Figure 4A:
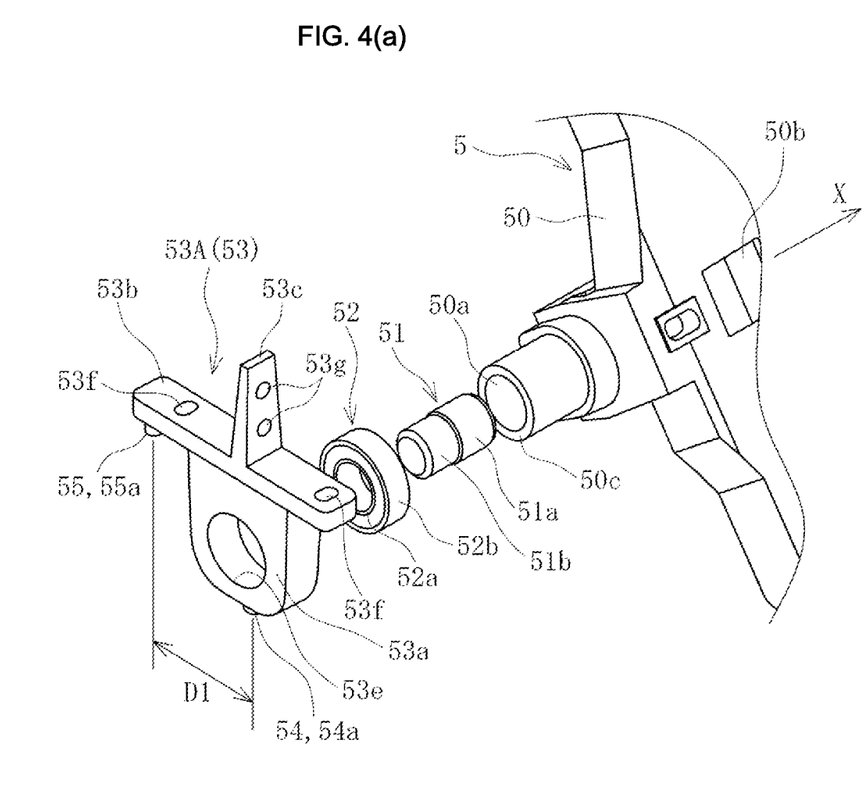
FIG. 4(a) is an exploded perspective view of a part of the reflecting-part support mechanism.
Figure 4B:
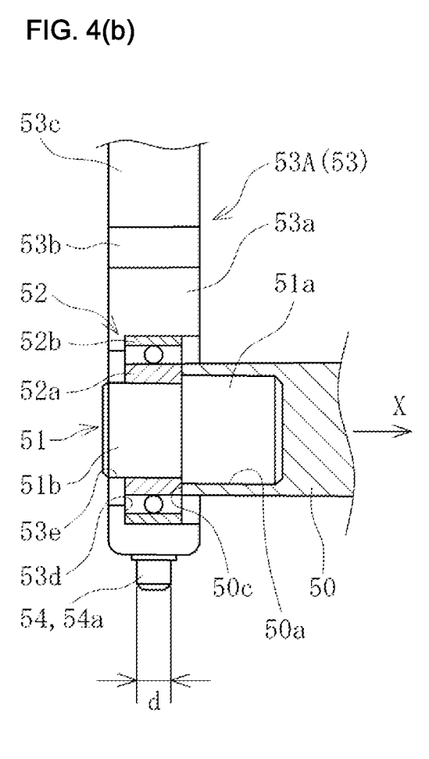
FIG. 4(b) is a sectional view of the assembled reflecting-part support mechanism.

The reflecting-part holder 50 is made of, for example, a die-cast titanium alloy made of the same metal material as that of the housing 1 to ensure rigidity. As illustrated in FIG. 4, in the reflecting-part holder 50, fitting holes 50a into which the rotary shaft parts 51 are fitted are formed at both ends in the width direction, and tip ends 50c of the fitting holes 50a are used to press the bearing 52 from the inside as described later. The rotary shaft parts 51 made of metal materials and provided separately are arranged in the linear axial direction X and fitted into the fitting holes 50a at both the ends. It is noted that each of the rotary shaft parts 51 may be formed integrally with the reflecting-part holder 50. The reflecting-part holder 50 includes a support pad 50b provided on the front side to conform to the curved surface of the concave mirror of the reflecting member 40, and the concave mirror is attached to the support pad 50b via a double-sided adhesive tape or the like so that the reflecting surface of the reflecting member 40 is not distorted.

The reflecting-part holder 50 is made of the same material as that of the housing 1, and thus avoids the effects of thermal expansion, thermal contraction, and the like and ensures assembly precision.

The rotary shaft part 51 is composed of a stepped shaft including a large diameter part 51a press-fitted into each of the fixing holes 50a of the reflecting-part holder 50 and a small-diameter part 51b press-fitted into an inner ring 52a of the bearing 52 (see FIG. 5(a)). The large diameter part 51a of the rotary shaft part 51 is press-fitted in the tip end of the fixing hole 50a of the reflecting-part holder 50. The rotary shaft part 51 is made of the same metal material as that of the reflecting-part holder 50, or another metal material, or a resin material.

As illustrated in FIG. 4, the bearing 52 is formed using a ball bearing. The small-diameter part 51b of the rotary shaft part 51 is press-fitted into the inner ring 52a of the bearing 52, and an outer ring 52b of the bearing 52 is fixed to the housing 1 via the bearing holder 53 so that the rotary shaft part 51 is rotatably supported.

In the HUD apparatus 100 of the present invention, the bearing holder 53 is formed of a metal material, for example, in a substantially plate shape. In the bearing holder 53, for example, the same bearing holder is used for the bearing holder 53 on one side and the bearing holder 53A on the other side opposite to the one side, and the bearing holder 53 on the one side and the bearing holder 53A on the other side are reverse to each other to be used (see FIGS. 3 and 4). It is noted that FIG. 4 illustrates the bearing holder 53A at the left side (the other side).

The bearing holder 53 (53A) includes a metal plate-shaped bearing mounting part 53a having a substantially U-shaped outer shape, and a fixing flange part 53b formed integrally with the upper end of the bearing mounting part 53a, and both ends of the fixing flange part 53b protrude along the front and back surfaces. The bearing 52 is fitted into the bearing mounting part 53a, and the bearing holder 53 is fixed to the housing 1 orthogonally to the axial direction X via the fixing flange part 53b.

In the bearing mounting part 53a, a circular mounting hole 53d into which the outer ring 52b of the bearing 52 is press-fitted from the inner side surface (insertion side of the rotary shaft part 51) is formed, and a through hole 53e having an outer diameter such that the outer ring 52b is locked and being larger than the inner ring 52a is formed at the tip end of the mounting hole 53d (the outer surface (the outer side in the insertion direction of the rotary shaft part 51)).

As a result, the bearing 52 press-fitted into the mounting hole 53d of the bearing holder 53 (53A) from the inner side is locked around the through hole 53e to be prevented from falling off to the outer side, and on the inner side, the tip end 50c of the fixing hole 50a of the reflecting-part holder 50 abuts against the inner ring 52a and is fixed so that the bearing 52 is prevented from falling off to the inner side.

Screw insertion holes 53f which are fixed to screw holes 17 provided in the housing 1 are formed at both ends of the fixing flange part 53b. Each of the screw insertion holes 53f has an elongated hole shape elongated along the axial direction X to be fixed to the housing 1 even if there are assembly errors and fabrication tolerances of the bearing holders 53 and 53A on both the sides.

A grip part 53c protruding upward is integrally formed at a central portion of the fixing flange part 53b. The grip part 53c protrudes upward from the central portion of the upper surface of the fixing flange part 53b and is formed in an inverted T shape. After the reflecting part 4 is assembled, the bearing holders 53 and 53A can be mounted on the housing 1 while the grip parts 53c at both the ends are gripped. This way makes it possible to easily perform, from above, the assembling work to the housing 1, and the like. It is noted that two through holes 53g in the vertical direction are formed in the grip part 53c to be utilized when the grip part 53c is gripped with a jig or the like.

The reflecting part 4 attached to the reflecting-part holder 50 in this way is rotatably supported to the housing 1 via the rotary shaft part 51, the bearing 52, and the bearing holder 53 (53A).

As illustrated in FIGS. 3 and 5, at both ends of the housing 1 in the axial direction X, rotary shaft support parts 16 are formed on which the bearing holders 53 (53A) are mounted, and each include a substantially U-shaped recess 16a and fixing surfaces 16b being upper surfaces at both ends of the recess 16a. Screw holes 17 are formed at both ends of the fixing surfaces 16b, respectively. The bearing mounting part 53a of the bearing holder 53 (53A) is mounted on the recess 16a, the fixing flange part 53b abuts against the fixing surfaces 16b, and screws mounted via the screw insertion holes 53f are screwed into the two screw holes 17 to fix the bearing holder 53 (53A).

For positioning with respect to the housing 1, the bearing holder 53 is provided with the positioning pin 54a on the bearing mounting part 53a, and the positioning pin 54a protrudes in the radial direction of the bearing 52 and constitutes the first supported part 54. For example, the positioning pin 54a protrudes vertically downward. The positioning pin 54a is formed integrally with the bearing holder 53 or separately from the bearing holder 53.

Details of the positioning of the reflecting part 4 with respect to the housing 1 by the first supported part 54 will be described later.

Figure 2:
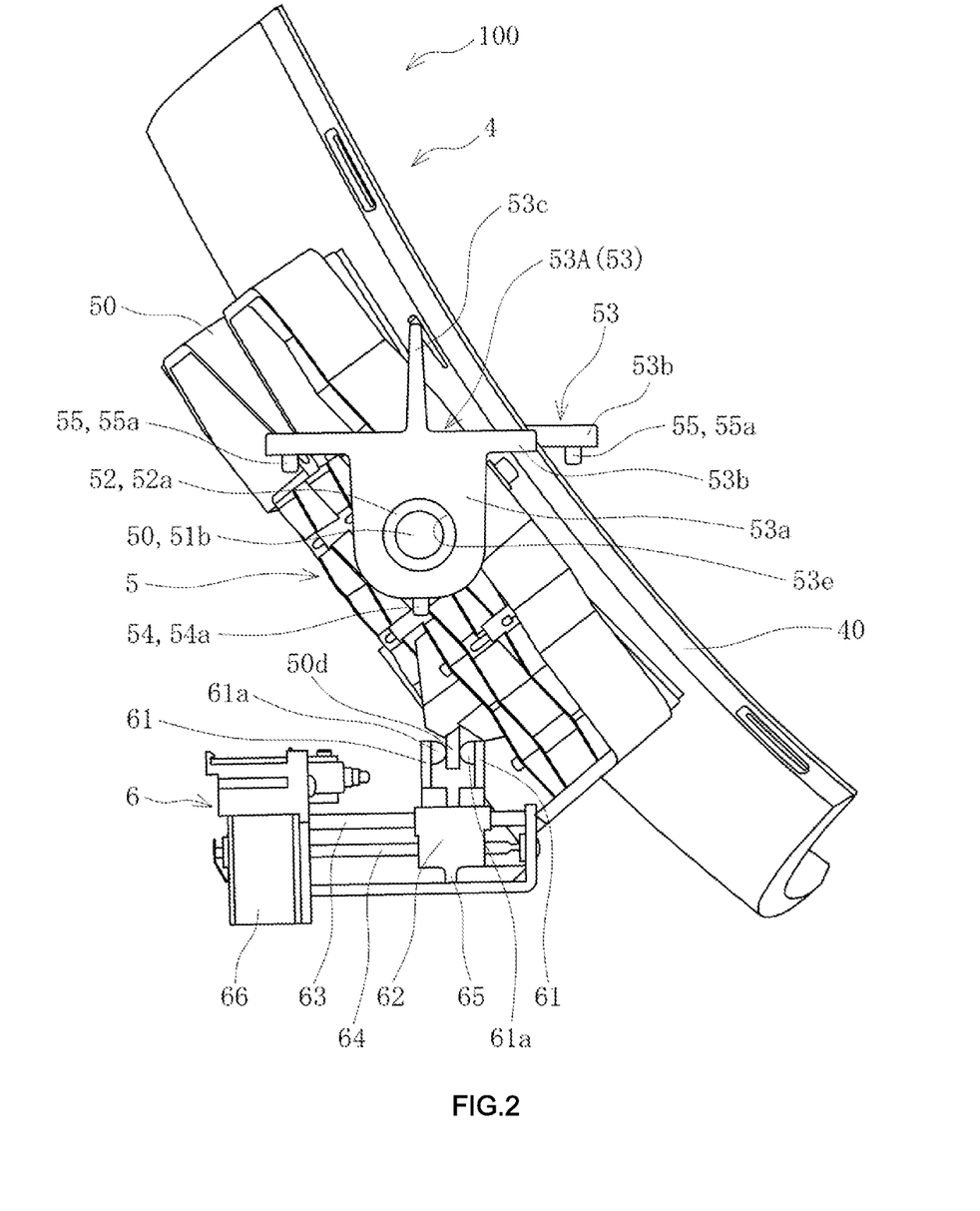
FIG. 2 is a schematic side view of a reflecting-part support mechanism and a reflecting-part drive mechanism according to one embodiment of the present invention.

As illustrated in FIGS. 1 and 2, the reflecting-part drive mechanism 6 is a mechanism that drives the reflecting part 4 about the axial direction X. The reflecting part 4 is rotatably supported about the rotary shaft (rotary shaft part 51) in the horizontal axial direction X by the reflecting-part support mechanism 5. The reflecting-part drive mechanism 6 is a drive mechanism for adjusting the rotation angle of the reflecting member 40 attached to the reflecting-part holder 50 to change the emission angle of the display light L toward the windshield 200.

The reflecting-part drive mechanism 6 includes a pair of arm parts 61 for clamping in the front-rear direction a driven part 50d formed integrally with the reflecting-part holder 50 to protrude downward from the lower portion of the back surface of the reflecting-part holder 50, a slider 62 for sliding the arm parts 61, a guide shaft 63 for guiding the slide of the slider 62, a lead screw 64 and a nut 65 for driving the slider 62, and a motor 66 for rotationally driving the lead screw 64.

The pair of arm parts 61 has hemispherical clamping parts 61a facing each other, and is mounted so that the driven part 50d of the reflecting-part holder 50 can reciprocate in the front-rear direction (the front and back direction of the reflecting member 40) and is slidable in the vertical direction between the clamping parts 61a.

The arm parts 61 are attached to the slider 62 and are slid in the front-rear direction along the guide shaft 63, and are driven in a way that the nut 65 attached to the slider 62 is reciprocated in the front-rear direction by means of the lead screw 64 driven by the motor 66.

As a result, reciprocating the slider 62 makes it possible to rotationally drive the reflecting-part holder 50 about the rotary shaft part 51 to adjust the rotation angle of the reflecting member 40 and thus to change the emission angle of the display light L toward the windshield 200 while the driven part 50d remains clamped even if the clamping position of the driven part 50d in the clamping part 61a (the distance from the center of the rotary shaft part 51) changes.

In the reflecting part 4, the reflecting-part holder 50 is supported by the bearing holder 53, the bearing 52, and the rotary shaft part 51 of the reflecting-part support mechanism 5, so that no play occurs in the axial direction X of the rotary shaft parts 51 and the like and it is also not necessary to provide a torsion spring or the like for eliminating the play, as in a conventional rotation support structure. Accordingly, in the reflecting-part drive mechanism 6, the load of the motor 66 does not change depending on the rotation position of the reflecting-part holder 50, and thus the reflecting-part holder 50 can be rotationally driven with a constant load.

This makes it possible to rotationally drive the reflecting-part holder 50 while maintaining a stable state with no problem of durability due to, for example, driving sound or load fluctuation.

The circuit board (not illustrated) is placed, for example, at a predetermined position in the housing 1, and is a printed circuit board on which a control unit (not illustrated) composed of a microcontroller including a CPU and a storage unit such as a ROM is mounted. The control unit of the circuit board is electrically connected to each of the display device 2 and the motor 66. The control unit acquires vehicle state information transmitted through a communication line from an external device (not illustrated) such as a vehicle electronic control unit (ECU), and drives the display device 2 based on the vehicle state information to cause the display device 2 to display a predetermined notification image. Further, the HUD apparatus 100 is provided with an input means (not illustrated) for a user such as the observer E to adjust the angle of the reflecting part 4, and the control unit drives the motor 66 and rotates the motor 66 by a predetermined angle in response to user's operations through the input means. Accordingly, the reflecting part 4 is rotationally driven about the rotary shaft part 51. It is noted that the input means may be a device outside the HUD apparatus 100 electrically connected to the control unit.

Next, positioning of the reflecting part 4 with respect to the housing 1 in the HUD apparatus 100 of the present invention will be described.

First, the positioning of the reflecting part 4 with respect to the housing 1 by means of the first supported part 54 of the reflecting-part holder 50 will be described.

Each of the bearing holders 53 is provided with the first supported part 54 protruding in the radial direction of the bearing 52. The housing 1 includes the hole-shaped first support part 12 in which the first supported part 54 of the one bearing holder 53 is positioned, and the elongated-hole-shaped second support part 13 along an axial direction X of the rotary shaft parts 51, and the first supported part 54 of the other bearing holder 53A is positioned in the elongated-hole-shaped second support part 13 (see FIGS. 3 and 5).

The bearing mounting part 53a of the bearing holder 53 is provided with the cylindrical positioning pin 54a having a diameter d to position the reflecting part 4 with respect to the housing 1. The positioning pin 54a protrudes in the radial direction of the bearing 52 and constitutes the first supported part 54. For example, the positioning pin 54a protrudes vertically downward in the radial direction (toward the bottom end) (see FIGS. 2 and 4, for example). The positioning pin 54a is formed integrally with the bearing holder 53 or separately from the bearing holder 53.

As illustrated in FIGS. 2 and 5(b), the first support part 12 of the housing 1 is formed on the rotary shaft support part 16 of the housing 1 to be a positioning hole 12a having a true circle with a diameter d in which the positioning pin 54a of the bearing holder 53 is positioned at a predetermined position as a positioning reference.

As illustrated in FIG. 5(a), the second support part 13 of the housing 1 is formed on the rotary shaft support part 16 of the housing 1 to be an elongated-hole-shaped elongated positioning hole 13a along the axial direction X of the rotary shaft parts 51 in which the positioning pin 54a of the bearing holder 53A is positioned. The elongated positioning hole 13a of the second support part 13 is located in the same axial direction X as the first support part 12, and the width in the direction orthogonal to the axial direction X of the elongated positioning hole 13a is sized to correspond to the diameter d of the positioning pin 54a.

Thus, the reflecting part 4 is positioned in the one bearing holder 53 in a way that the first supported part 54 being the cylindrical positioning pin 54a provided in the radial direction of the bearing 52 is fitted into the first support part 12 of the true-circle positioning hole 12a of the housing 1. The reflecting part 4 is positioned in the bearing holder 53 on the opposite side in a way that the first supported part 54 being the positioning pin 54a is inserted into the second support part 13 of the elongated positioning hole 13a elongated along the axial direction X of the rotary shaft parts 51.

In other words, the one bearing holder (on the right side in the illustrated example) 53 is positioned at a predetermined position of the housing 1 by means of the positioning pin 54a being the first supported part 54 and the positioning hole 12a being the first support part 12. On the other hand, the other bearing holder (on the left side being the opposite side in the illustrated example) 53A is allowed to have a dimensional tolerance in the axial direction X because of the elongated positioning hole 13a of the elongated-hole-shaped second support part 13 even if there is a change in distance (interval) D between the rotary shaft parts 51, and an axis deviation due to assembly errors of, for example, the fitting depth of the rotary shaft part 51 or the mounting position of the bearing 52 on the bearing holder 53, and is positioned in the orthogonal direction intersecting the axial direction X by positioning the positioning pin 54a being the first supported part 54 into the elongated positioning hole 13a of the second support part 13 having the same width as the diameter d.

As described above, the positioning pin 54a being the first supported part 54 provided in each of the bearing holders 53 and 53A can be positioned in a way that the pin 54a is positioned by means of the positioning hole 12a being the true-circle first support part 12 on one side of the housing 1, and the pin 54a is positioned by means of the elongated positioning hole 13a being the elongated-hole-shaped second support part 13 along the axial direction X on the other side of the housing 1, so that the reflecting-part holder 50 to which the reflecting member 40 of the reflecting part 4 is attached can be positioned at a predetermined position in the housing 1.

This makes it possible to perform an assembly operation with good precision while avoiding the effects of axis deviation error, the fabrication precision of the reflecting member, and the like. In particular, even if the interval D between the rotary shaft parts 51 at both ends increases as the size of the reflecting member 40 increases and accordingly, a dimensional tolerance due to the fabrication precision, axis deviation, or the like occurs, it is possible to reliably position the reflecting member 40 in the axial direction X and in a direction orthogonal to the axial direction X to perform an assembly operation.

Next, the positioning of the reflecting part 4 with respect to the housing 1 by means of a second supported part 55, a third support part 14, and a fourth support part 15 of the reflecting-part holder 50 will be described.

The HUD apparatus 100 of the present invention is configured so that in the bearing holder 53 (53A) being at least one of the pair of bearing holders 53 and 53A, the second supported part 55 is provided which is arranged to protrude in a direction intersecting with the axial direction X of the rotary shaft parts 51 and is positioned in the housing 1, and the housing 1 includes the elongated-hole-shaped third support part 14 along the direction intersecting with the axial direction X, in which the second supported part 55 is positioned.

Further, the HUD apparatus 100 of the present invention may be configured so that the bearing holder 53 having the same shape as the one bearing holder 53 provided with the second supported part 55 is arranged as the bearing holder 53A on the opposite side, and the housing 1 includes the elongated-hole-shaped fourth support part 15 in which the second supported part 55 of the bearing holder 53A on the opposite side is positioned and which is wider than the second supported part 55 and is along the axial direction X of the rotary shaft parts 51.

In the following HUD apparatus 100 of the present embodiment, as an example, a case will be described in which the bearing holder 53 having the same shape as the one bearing holder 53 provided with the second supported part 55 is also used as the bearing holder 53A on the opposite side, and the one bearing holder 53 and the bearing holder 53A are arranged reversely to each other.

The second supported part 55 is composed of a cylindrical positioning pin 55a having a diameter d which is provided in each of the bearing holders 53 (53A), and is arranged in a direction intersecting with the axial direction X of the rotary shaft parts 51. The positioning pin 55a constituting the second supported part 55 is provided at a portion protruding from the bearing mounting part 53a of the fixing flange part 53b of the bearing holder 53.

Here, the bearing holder 53 and the bearing holder 53A are same and are arranged reversely to each other. For example, in the one bearing holder 53 arranged on the right side, the positioning pin 55a is located on the front side being the reflecting surface of the reflecting member 40; in the other bearing holder 53A arranged on the left side (having the same specification as that of the one bearing holder 53, but being referred to as 53A for explanation), the positioning pin 55a is located on the back side being the reflecting-part holder 50 side opposite to the reflecting surface of the reflecting member 40. That is, the positioning pin 55a is located at a symmetrical position across the axial direction X vertically above the positioning pin 54a vertically below the bearing holder 53 (53A) (see FIGS. 2 and 3).

In the housing 1, the third support part 14 for positioning the positioning pin 55a of the second supported part 55 of the bearing holder 53 on one side is formed on the fixing surface 16b of the rotary shaft support part 16, and as illustrated in FIG. 5(b), an elongated positioning hole 14a elongated in the orthogonal direction intersecting with the axial direction X is formed.

The elongated positioning hole 14a being the third support part 14 is elongated in the direction orthogonal to the axial direction X, and the width of the elongated positioning hole 14a is a width (the width in the axial direction X) d corresponding to the diameter d of the positioning pin 55a.

In the housing 1, the fourth support part 15 for positioning the positioning pin 55a of the second supported part 55 of the bearing holder 53A on the other side is formed on the fixing surface 16b of the rotary shaft support part 16, and a laterally elongated positioning hole 15a is formed which is a hole elongated in the direction along the axial direction X and has a width d+a wider than the diameter d of the positioning pin 55a as illustrated in FIG. 5(a).

In other words, since the bearing holders 53 and 53A have the same shape and are reversed to each other in use, the positioning pin 55a of the second supported part 55 is located on the opposite side across the axial direction X, and the elongated positioning hole 14a and the laterally elongated positioning hole 15a where the positioning pin 55a is positioned are located on the opposite sides across the axial direction X accordingly.

Such positioning of the reflecting part 4 with respect to the housing 1 by means of the second supported part 55, the third support part 14, and the fourth support part 15 is performed as follows.

The rotary shaft part 51, the bearing 52, and the bearing holder 53 or the bearing holder 53A are each assembled to both ends of the reflecting-part holder 50. The reflecting member 40 is attached to the reflecting-part holder 50.

Thereafter, the grip parts 53c of the bearing holders 53 and 53A are gripped to lift the reflecting part 4, and the bearing mounting part 53a is mounted on the recess 16a of the rotary shaft support part 16 from above the housing 1 which is turned upside down.

On one side, the positioning pin 54a of the first supported part 54 protruding from the lower end of the bearing holder 53 is fitted into the true-circle positioning hole 12a serving as the first support part, and the positioning pin 54a of the second supported part 55 is mounted into the elongated positioning hole 14a of the third support part 14 of the fixing part 16b.

Accordingly, when the positioning pin 54a is fitted into the true-circle positioning hole 12a, the bearing holder 53 is placed at the home position. This makes it possible to position the positioning pin 55a by being mounted into the elongated positioning hole 14a which is a hole elongated in the direction orthogonal to the axial direction X even if there is an assembly error, fabrication tolerance, or the like (such as an interval D1 between the positioning pin 54a and the positioning pin 55a) in the positioning pin 55a, resulting in the positioned positioning pin 55a at a position with respect to the axial direction X and in a direction orthogonal to the axial direction X.

On the other side, the positioning pin 54a of the first supported part 54 protruding from the lower end of the bearing holder 53A is mounted in the elongated positioning hole 13a serving as the second support part, and the positioning pin 55a of the second supported part 55 is mounted in the laterally elongated positioning hole 15a of the fourth support part 15 of the fixing part 16b.

Accordingly, when the positioning pin 54a is mounted into the elongated positioning hole 13a, the bearing holder 53A can mount the positioning pin 54a into the elongated positioning hole 13a being a hole elongated along the axial direction X even if there is an assembly error, fabrication tolerance, or the like in the distance (interval) D between the bearing holders 53 and 53A, resulting in the positioned bearing holder 53A in the axial direction X in cooperation with the positioned bearing holder 53 on one side in the axial direction X. Further, the bearing holder 53 is positioned in the direction orthogonal to the axial direction X when the hole width of the elongated positioning hole 13a in the direction orthogonal to the axial direction X is the width d corresponding to the diameter d of the positioning pin 54a.

Further, the positioning pin 55a of the bearing holder 53A can be assembled by being mounted in the laterally elongated positioning hole 15a being elongated hole along the axial direction X, in which the hole width in the direction orthogonal to the axial direction X is the width d+a wider than the diameter of the positioning pin 55a even if there are an assembly error, fabrication tolerance, or the like in the distance (interval) D between the bearing holders 53 and 53A and between the positioning pin 54a and the positioning pin 55a (such as the interval D1 between the positioning pin 54a and the positioning pin 55a).

As a result, in a case where the bearing holder 53 on one side and the bearing holder 53A on the other side have the same shape and are reversed to each other, the positioning pin 54a and the positioning pin 55a can be positioned by being mounted into the elongated positioning hole 13a and the laterally elongated positioning hole 15a, respectively, even if there is an assembly error, fabrication tolerance, or the like, resulting in the positioned positioning pin 54a and positioning pin 55a at a position with respect to the axial direction X and in the direction orthogonal to the axial direction X.

In particular, according to the HUD apparatus 100, when the reflecting member 40 is increased in size, and the distance (interval) D between the rotary shaft parts 51 of the reflecting-part holder 50 is increased, even if an axis deviation or the like occurs due to an assembly error, fabrication tolerance, or the like, such as a change in the interval D1 between the positioning pin 54a and the positioning pin 55a, it is possible to position the bearing holders 53 and 53A at both ends by mounting the bearing holders 53 and 53A on the housing 1 and to perform an assembly operation with good precision.

In the HUD apparatus 100 described above, the pair of rotary shaft parts 51 are provided to protrude from both ends of the reflecting-part holder 50 that retains the reflecting part 4, the pair of rotary shaft parts 51 are rotatably supported on the housing 1 via the pair of bearings 52 and the pair of bearing holders 53 and 53A, respectively, each of the bearing holders 53 and 53A is provided with the first supported part 54 that protrudes in the radial direction of the bearing 52, and the housing 1 is provided with the hole-shaped first support part 12 where the first supported part 54 of the one bearing holder 53 is positioned, and the elongated-hole-shaped second support part 13 along the axial direction X of the rotary shaft parts 51 where the first supported part 54 of the other bearing holder 53A is positioned.

This makes it possible to reliably position the one bearing holder 53 in the axial direction X and in the direction intersecting with the axial direction X by fitting the first supported part 54 into the first support part 12.

Then, even if the distance (interval) D with respect to the other bearing holder 53A changes due to an assembly error (fitting depth or the like) of the rotary shaft part 51 to the reflecting-part holder 50 or an assembly error (fitting depth or the like) to the bearing 52 or a fabrication dimensional tolerance, it is possible to perform an assembly operation by means of the elongated hole of the second support part 13. Further, when the hole width of the elongated hole of the second support part 13 is caused to correspond to the size of the first supported part 54, positioning in the direction orthogonal to the axial direction X is also performed, the reflecting part 4 is retained in the predetermined state in the housing 1. This makes it possible to perform an assembly operation with good precision even if the reflecting member 40 is increased in size, and thus the interval D between the rotary shaft parts 51 is increased.

Further, since the reflecting part 4 is supported by the bearing 52 via the reflecting-part holder 50, there is no backlash in the rotary shaft part 51, and there is no need to provide a conventional torsion spring to prevent backlash, and it is possible to rotationally drive the reflecting part 4 with a constant load regardless of the rotation angle of the reflecting part 4. This makes it possible to prevent the occurrence of vibration and sound caused by the drive of the reflecting-part drive mechanism 6, and improve durability.

Further, in the bearing holder 53 being at least one of the pair of bearing holders 53, the second supported part 55 is provided which is arranged to protrude in a direction intersecting with the axial direction X of the rotary shaft parts 51 and is positioned in the housing 1, and the housing 1 includes the elongated-hole-shaped third support part 14 along the direction intersecting with the axial direction X, in which the second supported part 55 is positioned.

This makes it possible to position the second supported part 55 provided on the bearing holder 53 by being mounted on the third support part 14 of the housing 1, position the bearing holders 53 more reliably by the supported parts 54 and 55 at three places, and thus perform an assembly operation with good precision.

Furthermore, the bearing holder 53 having the same shape as the one bearing holder 53 provided with the second supported part 55 is arranged as the bearing holder 53A on the opposite side, and the housing 1 includes the elongated-hole-shaped fourth support part 15 in which the second supported part 55 of the bearing holder 53A on the opposite side is positioned and which is wider than the second supported part 55 along the axial direction X of the rotary shaft parts 51.

As a result, the bearing holder 53A having the same shape as the bearing holder 53 is provided on the opposite side, and thus it is possible to assemble the second supported part 55 by being mounted into the fourth support part 15. It is also possible to position the bearing holder 53A by the supported parts 54 and 55 at two places. Accordingly, it is possible to perform a more reliable assembly operation with good precision even if there is a change in the interval D1 between the first supported part 54 and the second supported part 55, for example.

Further, since the rotary shaft part 51 is provided separately from the reflecting-part holder 50, the rotary shaft part 51 can be manufactured separately from the reflecting-part holder 50, resulting in easily ensuring their fabrication precision. Moreover, if the materials of the rotary shaft part 51 and the reflecting-part holder 50 differ, the rotary shaft part 51 and the reflecting-part holder 50 can ensure the respective required durability and the like.

It is noted that the present invention is not limited in any way to the above embodiments and drawings. It is of course that modification (including deletion of constituent elements) can be applied to the embodiments.

In the above description, the example in which the display light L from the display device 2 is reflected by the plane mirror 3 and reaches the reflecting part 4 has been described. However, the present invention is not limited to this. The HUD apparatus 100 may not have the plane mirror 3 and may have a configuration in which the display light L from the display device 2 reaches the reflecting part 4 directly. Moreover, although the example which the display light L reflected by the reflecting part 4 is projected on the windshield 200 has been described, the present invention is not limited to this. The display light L reflected by the reflecting part 4 may be projected on a transmissive reflecting member (what is called a combiner) for exclusive use of the HUD apparatus 100.

Further, in the above description, the HUD apparatus 100 is installed in a vehicle. However, the present invention is not limited to this. The HUD apparatus 100 may be installed in the vicinity of a driver's seat in another moving body such as a ship or an aircraft.

In the above description, to facilitate understanding of the present invention, a description of known immaterial technical matters will be omitted as appropriate.

DESCRIPTION OF REFERENCE NUMERALS

100 HUD apparatus (head-up display apparatus),
200 Windshield
1 Housing
10 Opening part
11 Translucent cover
12 First support part
12a Positioning hole
13 Second support part
13a Elongated positioning hole
14 Third support part
14a Elongated positioning hole
15 Fourth support part
15a Laterally elongated positioning hole
16 Rotary shaft support part
16a Recess
16b Fixing surface
17 Screw hole
2 Display device
3 Plane mirror
4 Reflecting part
40 Reflecting member
5 Reflecting-part support mechanism
50 Reflecting-part holder
50a Fixing hole
50b Support pad
50c Tip end
50d Driven part
51 Rotary shaft part
51a Large diameter part
51b Small-diameter part
52 Bearing
52a Inner ring
52b Outer ring
53 Bearing holder (on one side)
53A Bearing holder (on the other side)
53a Bearing mounting part
53b Fixing flange part
53c Grip part
53d Mounting hole
53e Through Hole
53f Screw insertion hole
53g Through Hole
54 First supported part
54a Positioning pin
55 Second supported part
55a Positioning pin
6 Reflecting-part drive mechanism
61 Arm part
61a Clamping part
62 Slider
63 Guide shaft
64 Lead screw
65 Nut
66 Motor
X Axial direction
d Diameter (positioning pin)

The invention claimed is:

1. A head-up display apparatus for reflecting, by a reflecting part, display light emitted by a display device to express an image and displaying a virtual image corresponding to the image by the display light reflected by the reflecting part, the head-up display apparatus comprising:

a reflecting-part holder provided with i) a first rotary shaft part protruding at a first end of the reflecting-part holder and ii) a second rotary shaft part protruding at a second end of the reflecting-part holder, the first end of the reflecting-part holder being disposed opposite the second end of the reflecting-part holder, the reflecting-part holder for retaining the reflecting part;

a pair of bearings including a first bearing and a second bearing for rotatably supporting the first rotary shaft part and the second rotary shaft part, respectively; and a pair of bearing holders including a first bearing holder and a second bearing holder for retaining the first bearing and the second bearing in a housing respectively, wherein each of the first bearing holder and the second bearing holder includes a first supported part, wherein the first supported part protrudes in a radial direction of each of the first bearing and the second bearing, wherein the housing includes a hole-shaped first support part in which the first supported part of one of the first and second bearing holders is positioned, and an elongated-hole-shaped second support part along an axial direction of the first and second rotary shaft parts in which the first supported part of the other of the bearing holders is positioned, wherein each of the first bearing holder and the second bearing holder includes a first positioning pin, wherein the first bearing holder and the second bearing holder have an identical shape as each other, wherein the first bearing holder and the second bearing holder are respectively provided on the first end and the second end of the reflecting-part holder to be reverse of each other such that the first positioning pin of the first bearing holder is arranged to be on a front side of the reflecting part while the first positioning pin of the second bearing holder is arranged to be on a back side of the reflecting part, and wherein the front side is disposed on opposite of the back side of the reflecting part.

2. The head-up display apparatus according to claim 1, wherein at least one of the first and second bearing holders is provided with a second supported part to be positioned in the housing, the second supported part being arranged and protruding in a direction intersecting with the axial direction of the rotary shaft parts, and the housing includes an elongated-hole-shaped third support part along a direction intersecting with the axial direction, the second supported part being positioned in the third support part.

3. The head-up display apparatus according to claim 2, wherein the housing includes an elongated-hole-shaped fourth support part wider than the second supported part along the axial direction of the rotary shaft parts, the second supported part of the bearing holder on the opposite side being positioned in the fourth support part.

4. The head-up display apparatus according to claim 1, wherein the rotary shaft parts are provided separately from the reflecting-part holder.

5. The head-up display apparatus according to claim 1,
wherein the first bearing holder includes first screw insertion holes,
wherein the second hearing holder includes second screw insertion holes,
wherein the first screw insertion holes are arranged on the first bearing holder and the second screw insertion holes are arranged on the second bearing holder to be fixed to the housing, and
wherein each of the first screw insertion holes and the second screw insertion holes has an elongated hold shape elongated along the axial direction.

6. The head-up display apparatus according to claim 1,
wherein the first bearing holder includes a first fixing flange part and a first grip part,
wherein the first grip part protrudes upward from a central portion of an upper surface of the first fixing flange part such that the first fixing flange part and the first grip part form an inverted T shape,
wherein the second bearing holder includes a second fixing flange part and a second grip part, and
wherein the second grip part protrudes upward from a central portion of an upper surface of the second fixing flange part such that the second fixing flange part and the second grip part form the inverted T shape.

* * * * *